US006322861B1

(12) United States Patent
Wu

(10) Patent No.: US 6,322,861 B1
(45) Date of Patent: Nov. 27, 2001

(54) POLYMER PARTICLES

(75) Inventor: Jiun-Chen Wu, Robbinsville, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/709,770

(22) Filed: Nov. 10, 2000

Related U.S. Application Data

(62) Division of application No. 09/349,890, filed on Jul. 8, 1999, now Pat. No. 6,187,440.
(60) Provisional application No. 60/100,273, filed on Sep. 14, 1998.

(51) Int. Cl.[7] .................................................. G02F 1/1339
(52) U.S. Cl. ......................... 428/1.55; 428/407; 428/402; 428/403; 349/1.55
(58) Field of Search ..................................... 428/402, 403, 428/407, 1.55; 349/155

(56) References Cited

U.S. PATENT DOCUMENTS

| 5,231,527 | 7/1993 | Takanashi et al. . |
| 5,486,941 | 1/1996 | Saiuchi et al. . |
| 5,615,031 | 3/1997 | Saiuchi et al. . |
| 5,846,657 | 12/1998 | Wu . |

FOREIGN PATENT DOCUMENTS

| SHO 61-95016 | 5/1986 | (JP) . |
| HEI 5-148328 | 6/1993 | (JP) . |
| 97218414 | 8/1997 | (JP) . |

*Primary Examiner*—Alexander S. Thomas
(74) *Attorney, Agent, or Firm*—S. Matthew Cairns; Darryl P. Frickey

(57) ABSTRACT

Polymer particles made from copolymers of multifunctional (meth)acrylate monomer and multifunctional aromatic monomers are disclosed. Also disclosed are methods of improving the compression characteristics of (meth)acrylate polymer particles by copolymerizing with a multifunctional (meth)acrylate monomer a multifunctional aromatic monomer. The particles are of a size, uniformity, and contain physical characteristics that make them ideally suitable for use as spacers in liquid crystal display devices.

1 Claim, No Drawings

POLYMER PARTICLES

This application is a divisional of copending application Ser. No. 09/349,890, filed on Jul. 8, 1999, U.S. Pat. No. 6,187,440, which claims benefit of U.S. Provisional application No. 60/100,273, filed Sep. 14, 1998.

This invention relates generally to polymeric compositions made from multifunctional monomers. More particularly, this invention relates to polymeric compositions made from multifunctional (meth)acrylate monomers and multifunctional aromatic monomers.

It is very important to have precise control of the thickness of the liquid-crystal layer in liquid-crystal-based displays. The liquid-crystal layer acts as an electro-optic light valve that works in conjunction with polarizers to modulate the transmission of light through a display between two states one of off, where the liquid crystals block substantially all light, and one of on, where the liquid crystals allow transmission of light. Irregularities in the thickness of the liquid-crystal layer, also known as the cell gap, result in uneven display performance affecting such properties as contrast, transmittance, and the response time of the liquid-crystal layer to an electric signal.

Liquid crystal displays have a structure such that two substrates, generally glass or plastic sheets, are disposed opposite to each other through optionally a color filter on the inside surface of the top substrate (top is the side toward the viewer), an alignment layer, an electrode layer, a spacer particle, and a liquid crystal layer. Spacers are used to control the thickness of the liquid crystal layer and as well as to provide a uniform thickness of the liquid crystal layer over the entire active area of the display. Other means for controlling the cell gap include the flatness of the substrate material, the flatness of the layers between the substrates, the number of spacer particles in any given area, and the spatial distribution of spacer particles with respect to one another.

Particles generally suitable for use as spacers in liquid crystal displays are chosen from among glass; oxides of silica, alumina or other ceramics; and plastics. The shape of particles generally suitable for use as spacers in liquid crystal displays are chosen from among cylindrical rods having aspect ratios from about 1:2 to greater than 1:10, and spherical balls. The choice of spacer particles is largely dictated by the characteristics of the spacer particles that include but are not limited to: uniformity of the particle diameter, amount of impurities that may leach into the liquid crystal layer, compatibility with the liquid crystal layer, hardness, compressibility, coefficient of thermal expansion, elastic modulus, refractive index, thermal stability, and dielectric constant.

In addition to maintaining the cell gap, spacer particles are very important in establishing the correct cell gap during the assembly of liquid crystal displays. The liquid-crystal display assembly process generally requires the following steps: a) spacer particles are deposited in a pre-determined concentration onto one sheet of glass or plastic substrate, b) a sealant is applied along the edge of the same substrate in a fashion similar to a picture frame leaving a small gap that will later be used to fill the liquid crystal material, c) a second sheet of glass or plastic substrate is placed over the first substrate containing the spacer particles and the adhesive, d) the two substrates are pressed together at an elevated temperature to cure the adhesive and therefore sealing the substrates together. The properties of the spacer particles must be such that the particles do not degrade during the application of heat and pressure in the sealing process; the spacer particles must have sufficient thermal stability to withstand heating and also good compression strength so as to not break or fracture under load.

Plastic spacers will deform in the edge-sealing process described above. The extent of deformation can vary significantly, and is a function of the composition of the spacer, the amount of pressure applied during the sealing process, and the heat applied during the sealing process. It is preferred that a plastic spacer deform slightly when exposed to heat and pressure and then recover some or all of its original shape when the heat and pressure are removed. The extent of recovery, or alternatively, the extent to which the spacer particle is deformed and then resumes some or all or its original diameter, is known as the recovery factor. The recovery factor is described in detail in W.O. Pat. Appl. No. 9206402, see in particular FIG. 4 of the cited patent application. In the measurement of recovery factor a given load is applied to a spacer particle and the displacement of the spacer caused by the load is measured ($L_1$). The load is then removed and the extent to which the original particle diameter recovers is given as ($L_2$). The recovery factor is calculated by ($L_2/L_1$). In view of the variations in display quality, there is a continuing need for spacer particles that have a balance of properties affecting control of the cell gap during, and after, the cell sealing process and impacting both the thermal stability and the recovery factor of the spacer.

W.O. Pat. Appl. No. 9206402 discloses spheres with certain elastic modulus and recovery factor properties. The spheres may be applied as spacers for liquid-crystal display elements. The spheres are made of polydivinylbenzene, divinylbenzene-styrene copolymer, divinylbenzene-acrylate copolymers, or polydiallylphthalate.

U.S. Pat. No. 5,231,527 discloses a liquid crystal display with two sheets of substrates disposed opposite to each other, transparent electrodes, orientation films, a spacer particle with a certain range of elastic modulus, and a liquid crystal layer. The spacer particle may be made of a crosslinked vinyl copolymer.

U.S. Pat. No. 5,846,657 (Wu) discloses spacer particles with certain compression values and recovery factors. The particles are polymers of a 1,4-butanediol diacrylate or 1,6-hexanediol diacrylate. These particles have a high compression strength such that they withstand high loads before breaking. However, these particles have a low initial compression strength, such that the load these particles can withstand before deforming 10% of their original size is limited. A high initial load compression strength is important because it allows for the use of fewer particles to achieve the same result.

Despite the teachings of the disclosures, there is a continuing need to provide improved spacer particles of uniform size which, and which possess, desirable physical characteristics.

The present invention is directed to a plurality of polymer particles comprising a copolymer of 1 to 30% wt, based on the total weight of the monomers in the copolymer, of a multifunctional (meth)acrylate monomer and 70 to 99% wt, based on the total weight of the monomers in the copolymer, of a multifunctional aromatic monomer, said particle having a particle size of 1 to 15 microns with a standard deviation of less than 4% of the mean diameter; and a recovery factor greater than 35%.

The present invention is also directed to a method of improving the compression characteristics of a (meth)acrylate polymer particle by copolymerizing with a multifunctional (meth)acrylate monomer from 1 to 99%, based on the total weight of the monomers in the copolymer, of a multifunctional aromatic monomer.

The present invention is further directed to a liquid crystal display containing a spacer particle formed from a copolymer of 1 to 30% wt, based on the total weight of the monomers in the copolymer, of a multifunctional (meth) acrylate monomer and 70 to 99% wt, based on the total weight of the monomers in the copolymer, of a multifunctional aromatic monomer.

As used throughout the specification, multifunctional monomers are understood to contain two or more polymerizable groups. Suitable multifunctional monomers may contain two, three, four or more polymerizable groups. As used herein, the term "(meth)acrylate" refers to methacrylate and acrylate.

Suitable multifunctional (meth)acrylate monomers include, but are not limited to, ($C_2$–$C_{18}$)alkanediol di(meth) acrylates. It is preferred that the multifunctional (meth) acrylate monomers are ($C_2$–$C_{10}$)alkanediol di(methacrylates, and more preferably ($C_4$–C8)alkanediol (meth)acrylates. Suitable ($C_2$–$C_{18}$)alkanediol (di(meth) acrylates include, but are not limited to: 1,2-ethanediol di(meth)acrylate; 1,3-propanediol di(meth)acrylate; 1,4-butanediol di(meth)acrylate; 1,5-pentanediol di(meth) acrylate; 1,6-hexanediol di(meth)acrylate; 1,8-octanediol di(meth)acrylate; and 1,10-decanediol di(meth)acrylate. Especially preferred are the di-functional acrylate monomers 1,6-hexanediol diacrylate ("HDDA"); 1,4-butanediol diacrylate ("BDDA"); and mixtures thereof. As used throughout this specification, it is understood that mixtures of the various (meth)acrylate monomers are within the scope of the invention. The following abbreviations are used throughout the specification: C=centigrade; ml=milliliter; µm=micron; wt %=weight percent; and ASTM=American Society of Testing Materials.

Suitable multifunctional aromatic monomers are any aromatic monomers that have two or more polymerizable groups and can be copolymerized with the multifunctional (meth)acrylate monomers. Suitable multifunctional aromatic monomers include, but are not limited to: divinylbenzene; divinylnaphthalene; diallyl phthalate and N,N-divinyl aniline. Divinylbenzene is the preferred multifunctional aromatic monomer. As used throughout this specification, it is understood that mixtures of the various aromatic monomers are within the scope of the invention.

Other multifunctional monomers may optionally be copolymerized with the (meth)acrylate monomers and aromatic monomers of the present invention. Suitable optional multifunctional monomers include, but are not limited to: divinyl sulfide; divinyl solfone; diallyl acrylamide; triallyl (iso)cyanurate; divinyloxybutane; divinyl ether; diallyl maleate; allyl acryloxypropionate; 2,2'-bis(4-(meth) acryloxypropyloxyphenyl)propane; 2,2'-bis(4-(meth) acryloxydiethoxyphenyl)propane; and triallyl trimellitate.

The polymer particles of the present invention are prepared in a multi-step process which includes: 1) the emulsion polymerization of a pre-seed particle, which is preferably mildly crosslinked; 2) emulsion polymerization of pre-seed particles to form seed particles; 3) swelling of the seed particles with monomers and polymerizing said monomers to form highly-crosslinked polymer particles; and 4) the optional incorporation of adhesive properties, conductive coatings or colorants to the particles. A description of such emulsion polymerization techniques is disclosed in U.S. Pat. No. 5,846,657 (Wu), herein incorporated by reference to the extent it teaches emulsion polymerization of such particles.

It is preferred that the particles of the present invention be cured after polymerization. Such curing improves the compression resistance of the particles. Curing may be by any suitable means, such as chemical or heat curing. Heat curing is preferred. When the particles are heat cured, they may be cured in the reactor after polymerization, or may be cured in an oven.

The particles may be heat cured at any temperature from 100° C. up to 10° C. below the decomposition temperature of the copolymer. For example, if a copolymer decomposes at 200° C., the maximum temperature for heat curing would be 190° C. It is preferred that the particles be cured at a temperature no higher than 20° C. below their decomposition temperature. Suitable temperatures for heat curing the particles of the present invention are from 100° C. to 320° C., preferably from 100° to 250° C., and more preferably from 120° to 200° C. Typically, the polymer particle is held at the curing temperature for 0.5 to 6 hours, and preferably from 1 to 4 hours.

The final diameter of the polymer particles of the present invention is typically from about 1.0 to 15.0 microns, more preferably from 3.0 to 10.0 microns, and most preferably from about 4.0 to 7.0 microns. One of the advantages of the particles of the present invention is that they have a very narrow particle-size distribution.

The particle size distribution is such that the standard deviation of the particle size is typically 4% or less of the mean diameter, preferably the standard deviation of the particle size is 3% or less of the mean diameter and most preferably the standard deviation of the particle size is 2% or less of the mean diameter. Surprisingly the present invention provides for a standard deviation that is invariant with particle size diameter, such that a particle with a diameter of one micron has substantially the same standard deviation based on diameter as a particle with a diameter of five microns and additionally a particle with a diameter of ten microns. Previous disclosures have standard deviations of particle size that vary with varying particle diameter. Previous disclosures have standard deviations ranging from 4.5% to 7.0% based upon particle diameter for diameters ranging from 3.0 microns to 11 microns, respectively.

A further advantage of the present invention is the substantial elimination of classification processes to produce the narrow particle size distributions described hereinabove. The narrow particle size distribution is surprisingly inherent to the process of making the spacer particles. The removal of aggregates and fines is minimized, and does not significantly diminish the yield of spacer particles within the target particle size and having the desired particle size distribution.

The polymer particles of the present invention may be used as spacers in liquid display devices due to their narrow particle size distribution and the physical characteristics. Such liquid display devices are known in the art and described in the literature. Typical liquid crystal display arrangements are described in PCT 92/06402 and U.S. Pat. No. 5,231,527. Liquid crystal display arrangements of the present invention comprise two sheets of substrates disposed opposite to each other; with transparent electrodes disposed on each of said substrates and orientation films disposed over transparent electrode, the spacer particle of the present invention and a liquid crystal layer disposed the orientation films.

The area occupied by a spacer in a liquid crystal display does not contain any liquid crystal, the liquid crystal layer will be displaced by the spacer particle. Accordingly, a clear spacer will scatter some light and appear as a white area. This white area will increase the brightness of the display in the off-state (when no light is being transmitted through the display) and thus reduce the contrast between the on-state and the off-state. One mechanism to improve the contrast is to use a black, or other darkly colored, spacer. Thus, when the particles of the present invention are used as spacers, it is preferred that they are colored. In a most preferred embodiment the spacers are colored black. Typical methods for coloring the spacer particles include staining, pigment mixing, and the addition of dyes to monomers prior to polymerization. Other techniques known in the art include imbibing colorants into the spacer particles or the reactive coupling of a colorant and the spacer particle. A preferred method of coloring the spacer is the reactive coupling of a colorant to a spacer particle.

In an especially preferred embodiment of the present invention the particle is provided with adhesive properties. Polymer particles having adhesive properties are especially useful in the field of liquid crystal displays. The adhesive properties aid in keeping the substrates from becoming misaligned from one another in the manufacturing process and also provide adhesion between the substrates after the manufacturing process. The adhesive properties may also reduce the movement of the spacers on the substrates and thereby reduce the potential for, or the amount of, damage to the substrates or coatings on the substrate.

There are known mechanisms for obtaining adhesion between articles, one is through the use of reactive coupling to create bonds and another is through the use of thermoplastic materials known in the art. Reactive coupling is a process of creating a chemical bond between two articles through the generation of reactive functional groups. Reactive functional sites are amenable to chemical bond formations, including but not limited to free radical, acidic, basic, and cationic sites. Methods for generating reactive functional sites can include UV radiation, thermal activation and other known processes.

A preferred embodiment of the present invention employs UV radiation to generate free radicals. It is believed that UV-cure adhesives adhere two surfaces through the following process: a) a spacer particle containing adhesive properties is exposed to ultraviolet radiation such that certain molecules within the adhesive create free radicals, and b) the free radicals form covalent bonds with reactive groups contained within the coatings on the substrate (for example, the alignment layer in a liquid crystal display) but may also form covalent bonds with reactive groups contained within the adhesive and also within the spacer particle in areas not having adhesive properties.

It is believed that thermal-cure adhesives adhere two articles through a process different from that of UV-cure adhesives. It is further believed that thermal-cure adhesives adhere articles through the following process: a) a spacer particle containing an adhesive layer, whereby the adhesive layer comprises a thermoplastic resin, is heated generally to a temperature above the glass transition temperature of the thermoplastic resin contained within, or substantially comprising, the adhesive layer, and b) the thermoplastic resin melts or otherwise deforms to form an attachment to the article, or coatings on the article, through a mechanism believed to entail intercalation, or pore-filling, of the thermoplastic adhesive material into pores or irregularities in the surface of the article or coatings on the article.

In an especially preferred embodiment, reactive coupling, preferably the generation of free radicals from UV absorption, is employed in combination with a thermoplastic adhesive. An improvement of using both thermal-cure and UV-cure adhesives is the curing rate of the adhesive can be accelerated during the assembly of the liquid crystal display. An additional improvement of using both thermal-cure and UV-cure adhesives is the added adhesive strength afforded to the system by multiple points of contacts between the spacer and the substrates and the multiple mechanisms for achieving said contact being both thermoplastic and reactive coupling.

Suitable materials for use as thermoplastics include poly (meth)acrylate, polyolefins, polyurethanes and the like.

Suitable materials for use in reactive coupling include aryldiazonium salts, diarylhalonium salts, triarylsulfonium salts, epoxides, anhydrides, carboxylic acids, hydroxy-containing compounds, amines, nitrobenzyl esters, sulfones, phosphates, n-hydroxyimide sulfonates, cobalt-amine and alkyl amine salts, O-acyloximes and diazonaphthoquinones. A preferred embodiment is the use of reactive coupling agents which can be incorporated into a polymer. An especially preferred embodiment is the use of 2-hydroxy-(3-methacryloxy)-propyl-1-(2-benzoyl) benzoate, which is available from the Rohm and Haas Company.

The present invention, in a highly preferred embodiment, provides for a mechanism to incorporate a spacer with a thin layer or coating on the outer-most surface of the spacer, also known as a vicinal layer, having adhesive properties, containing both reactive coupling and thermoplastics, such that the vicinal layer is a part of the spacer and is distinguishable from a coating contacting the surface of the spacer as previously disclosed in the art. The vicinal layer includes from 0.1 to 90 weight percent reactive coupling moieties and from 10 to 99.9 weight percent thermoplastic.

In another embodiment of the present invention conductive materials are applied to the surface of the spacer. The conductive material may be a conductive polymer, intrisinically conductive polymer, doped polymers, and metals. Suitable conductive polymers include polymers such as polyacrylonitrile butadiene styrene, polyvinyl chlorides, polyphenylene-based alloys, or polycarbonate blended with one or more anionic compounds to instill conductivity such as alkali salts, nonionic compounds such as fatty acid esters and cationic compounds such as quaternary ammonium salts. Suitable intrisinically conductive polymers include, but are not limited to: polythiophene, polypyrrole, poly (phenylenesulfide), poly(phenylenevinylene), polyacetylene, polyaniline and polyisothianaphthene. Suitable doped polymers include such as polyacetylene doped with either $I_3^-$ or $Na^+$; polypyrrole doped with $BF_4^-$ or $ClO_4^-$; polythiophene doped with $BF_4^-$, $ClO_4^-$, or $FeCl_4$; polyazulene doped with $BF_4^-$ or $ClO_4^-$; and polythienylenevinylene doped with $AsF_5$. Suitable metals include highly conductive species such as, but not limited to: copper, nickel, aluminum, gold and the like. Especially preferred is gold. Suitable methods for coating spacer particles with conductive materials are set forth at length in WO 9206402.

The particles of the present invention possess a number of improved properties as compared to known particles. For example, the present particles have enhanced mechanical properties such as improved compression strength, recovery factors and improved resistivity as compared to known particles. Other improved properties include refractive index and coefficient of thermal expansion.

Compression strength is the amount of force the particle can withstand before it crushes. The particles of the present invention have a compression strength of greater than 150 kilograms per square millimeter ($kg/mm^2$). This compression strength value is sufficiently high such that the spacer particles do not fracture or crush during the cell-sealing process. In addition to high compression strength, the present particles possess a higher initial load compression strength than known spacer particles. Such a high initial load compression strength, also known as the compression strength at 10% deformation of the particle, is important as it allows for the use of fewer particles in liquid crystal displays. This is very advantageous as fewer "foreign" materials will be present that could adversely affect the contrast between the "on" and "off" states.

The hardness (K value) of the polymer particles of the present invention is typically greater than 600 kg/mm$^2$; preferably greater than 625 kg/mm$^2$; more preferably greater than 650 kg/mm$^2$; and even more preferably greater than 700 kg/mm$^2$. It is preferred that the hardness of the polymer particles is in the range of 600 to 900 kg/mm$^2$; and preferably in the range of 625 to 875 kg/mm$^2$.

The particles of the present invention, when used as spacers, provide recovery factors of greater than 35 percent, preferably greater than 38 percent and most preferably greater than 40 percent, and even more preferably greater than 45 percent. Typically, the recovery factor is in the range of 35 to 60 percent. Recovery factors are important measurements because during cell sealing processes, typically, the two opposing substrates are compressed and the spacers must compress slightly with pressure and re-expand upon releasing the pressure. The recovery factor can be used to predict the cell-gap maintained after the cell-assembly process.

The resistivity of the spacers is also greatly improved by the spacers of the present invention. The spacers have resistivity of greater than $4.0 \times 10^{15}$ ohm-cm, Preferably the resistivity is greater than $5.0 \times 10^{15}$ ohm-cm. High resistivity is important in a spacer for liquid crystal displays. The liquid crystal molecules allow the transmission of light through a display in response to an electric field. Material within the liquid-crystal layer degrading the dielectric property of the liquid crystal layer, or alternatively increasing the conductivity of the liquid crystal layer, will adversely affect display performance.

The coefficient of thermal expansion of the spacers is also greatly improved by the spacers of the present invention. The spacers have coefficients of thermal expansion greater than $100 \times 10^{-6}/°$ C. and less than $125 \times 10^{-6}/°$ C. Preferably the coefficient of thermal expansion is greater than $110 \times 10^{-6}/°$ C. and less than $120 \times 10^{-6}/°$ C. The coefficient of thermal expansion of a spacer will define, in part, the spacers ability to expand and contract in response to temperature. Ideally, the coefficient of thermal expansion of a spacer will match that of the liquid crystal layer such that when the liquid crystal display is exposed to thermal cycling the expansion and contraction of the spacer particle will match the expansion and contraction of the liquid crystal layer. Sufficient mismatch of the coefficient of thermal expansion between that of the spacer and that of the liquid crystal layer may result in the formation of voids upon thermal cycling and adversely affect display performance.

The index of refraction of a spacer is ideally matched to that of the substrate. The index of refraction for a glass substrate used in a liquid crystal display is in the range of 1.53 to 1.55. The spacers of the present invention have refractive indices of about 1.50.

The polymer particles of the present invention have a modulus of elasticity in compression of greater than 500 kg/mm$^2$. The modulus of elasticity is preferably greater than 520 kg/mm$^2$; more preferably greater than 550 kg/mm$^2$; and even more preferably greater than 600 kg/mm$^2$. Particularly useful ranges of the modulus of elasticity are 520 to 800 kg/mm$^2$; preferably 550 to 750 kg/mm$^2$; and more preferably 600 to 750 kg/mm$^2$.

The following examples are intended to illustrate the process by which the compositions of this invention are made, the compositions of this invention, and the unexpected beneficial properties of the compositions of this invention when applied as spacers in liquid crystal displays.

EXAMPLE 1: COMPARATIVE

In this example the 0.69-micron seed particles prepared according to Example 2 of U.S. Pat. No. 5,846,651 (Wu) were grown to 5.00 micron diameter using an emulsion of 1,6-hexanediol diacrylate. The following mixtures were prepared:

| Mixture | Component | Parts by Weight |
|---|---|---|
| A | water | 160 |
|   | 3% aqueous Solusol ® (available from American Cyanamid Fine Chemical Div.) | 1.52 |
| B | Seed emulsion (0.69 μm) at 6.73% solids | 3.86 |
|   | water | 12.5 |
| C | 1,4-hexanediol diacrylate ("HDDA") | 100 |
|   | 50.8% aqueous methyl beta-cyclodextran | 1.56 |
|   | 75% aqueous Solusol ® | 0.81 |
|   | water | 89.0 |
| D | tert-Butyl peroctoate | 0.50 |
|   | 3% aqueous Solusol ® | 3.33 |
|   | 0.11% aqueous sodium p-nitrosophenolate | 1.48 |
|   | water | 10.0 |
| E | 30% aqueous poly(n-vinylpyrrolidone) | 16.7 |
|   | water | 6.25 |

Mixture A was added into a reactor and heated to 65° C. with stirring. Mixture B was then added into the reactor. Mixture C was blended by an OMNI homogenizer for 5 minutes to form an emulsion and then added into the reactor. The reactor was stirred at 60° C. for 2 hours and then cooled to 25° C. The stirring was continued overnight. Mixture D was blended by an OMNI homogenizer for 3 minutes to form an emulsion. This emulsion was added to the reactor and followed by the addition of Mixture E. After 1 hour stirring at 25° C., the reactor was heated to 60° C. and held for 1 hour at 60° C. before heating to 90° C. Stirring was continued at 90° C. for 1 hours, after which the reactor contents were cooled to room temperature for filtration through a Nylon cloth having 125-μm openings.

The filtered mixture was transferred into a pressure reactor. With stirring turned on, the reactor was heated to 100° C. After heating at 100° C. for 1 hour, the reactor was heated to 180° C. in 3 hours. After heating at 180° C. for 1 hour, the reactor was cooled to room temperature and filtered through a Nylon cloth having 125-μm openings.

The polymer particles, pHDDA, from the reaction mixture, when examined by an optical microscope, were uniformly sized and were 5.00 microns.

EXAMPLE 2

Polymer particles were prepared according to Example 1 except that the HDDA was replaced with a mixture of 50 parts of divinylbenzene ("DVB") and 50 parts of HDDA. The resulting polymer particles, p(DVB 50/HDDA 50), were uniformly sized and had a particle size of 5.00 microns.

EXAMPLE 3

Polymer particles were prepared according to Example 1 except that the HDDA was replaced with a mixture of 75 parts of DVB and 25 parts of HDDA. The resulting polymer particles, p(DVB 75/HDDA 25), were uniformly sized and had a particle size of 5.00 microns.

EXAMPLE 4

Polymer particles were prepared according to Example 1 except that the HDDA was replaced with a mixture of 88 parts of DVB and 12 parts of HDDA. The resulting polymer particles, p(DVB 88/HDDA 12), were uniformly sized and had a particle size of 5.00 microns.

EXAMPLE 5

The polymer particles prepared according to Examples 1–4 were tested for initial compression strength at 25° C. The load at 10% deformation of individual spacers was determined on a micro-compression testing instrument from Shimadzu Scientific Instruments Inc., model number is MCTM-500. The results of the tests are reported in Table 1.

TABLE 1

| Polymer Particles | | Composition, Wt % | | Load at 10% Deformation |
|---|---|---|---|---|
| Identification | Size, μm | HDDA | DVB | gram force |
| Example 1 (comparative) | 5.00 | 100 | 0 | 0.123 |
| Example 2 | 5.00 | 50 | 50 | 0.147 |
| Example 3 | 5.00 | 75 | 25 | 0.163 |
| Example 4 | 5.00 | 88 | 12 | 0.172 |

The above results demonstrate the compositions of this invention have improved compression strength at initial deformation over known polymer particles.

EXAMPLE 6

Polymer particles were prepared according to Example 1 except that the HDDA was replaced with a mixture of 25 parts of DVB and 75 parts of HDDA. The resulting polymer particles, p(DVB 25/HDDA 75), were uniformly sized and had a particle size of 4.00 microns.

EXAMPLES 7–8

Polymer particles were prepared according to Example 1 except that the HDDA was replaced with a mixture of DVB and 1,4-butanediol diacrylate ("BDDA"). The amounts of DVB and BDDA used and the particle sizes of the resulting polymer particles are reported in Table 2.

TABLE 2

| Example | DVB, wt % | BDDA, wt % | Particle Size (μm) |
|---|---|---|---|
| 7 | 88 | 12 | 4.5 |
| 8 | 75 | 25 | 4.5 |

EXAMPLE 9

This example shows the formation of adhesives onto the polymer particles of in the emulsion of Example 6. The following mixtures were prepared:

| Mixture | Component | Parts by Weight |
|---|---|---|
| F | Emulsion from Example 5 at 24.97% solids | 1732 |
| | water | 374 |
| G | Sodium formaldehyde sulfoxylate | 1.62 |
| | water | 251 |
| H | Methylolacrylamide and acrylamide (45% aqueous solution from Rohm and Haas Company) | 18.0 |
| | water | 108 |
| I | 1,6-Hexanediol diacrylate | 0.22 |
| | n-Butyl methacrylate | 10.8 |
| | Styrene | 89.0 |
| | water | 74.8 |
| J | tert-Butyl hydroperoxide 70X ® (from Lucidol Division of Pennwalt Corp.) | 2.43 |
| | 3% aqueous Solusol ® | 3.60 |
| | water | 195 |

Mixture F was added into a reactor and heated to 70° C. with stirring. One half of Mixture G was then charged into the reactor. The second half of Mixture G, and Mixtures H, I, and J were evenly added into the reactor over 5 hours. Stirring was continued at 70° C. for 1 hour, after which the reactor contents were cooled to room temperature and filtered through a Nylon cloth having 125-μm openings. The polymer particles from the reaction mixture, when examined by an optical microscope, were found to be uniformly sized.

EXAMPLE 10

This example demonstrates the formation of a conductive coating on 5.00 micron particles of p(DVB 88/HDDA 12).

A 50 ml beaker was charged 1.00 gram of cleaned 5.00-micron particles of p(DVB 88/HDDA 12). Conditioner PM-922 (Shipley Company) of 30 ml heated to 49° C. was charged into the beaker. The suspension was stirred intermittently with a glass stir rod and the beaker was placed on a hot plate to maintain the temperature. After 5 minutes the polymer particles were isolated by filtration from the solution using a.0.45 micron filter disk (Micron Separation Inc.). They were rinsed 3 times with 20 ml portions of deionized water. The particles were then charged into a 50 ml beaker along with 30 ml of Neutralizer PM-954 (Shipley Company) from a heated reservoir maintained at 32° C. The suspension was placed on a hot plate to maintain the temperature and stirred intermittently for 5 minutes. The particles were then collected and washed 3 times with 20 ml portions of deionized water. The particles were charged into a 50 ml beaker along with 30 ml of Catapostit 44® (Shipley Company) and heated to 32° C. The suspension was placed on a hot plate to maintain the temperature and stirred intermittently for 4 minutes. The particles were collected and washed 3 times with 20 ml portions of deionized water. The polymer particles were charged into a 50 ml beaker again and then 30 ml of Accelerator 19 (Shipley Company) heated to 32° C. was added. The suspension was placed on a hot plate to maintain the temperature and stirred intermittently for 3 minutes. Then the sample was collected by filtration and washed three times with 20 ml aliquots of deionized water. The sample was again charged into a 50 ml beaker and then 30 ml of Niposit® Electroless Nickel PM-980 (Shipley Company) heated to 27° C. was added. The suspension was stirred for 3 minutes and the beaker was placed on a hot plate to maintain the temperature. Upon addition of the Electroless Nickel solution a reaction occurred and the polymer particles turned from white to gray. The polymer particles were isolated and washed an additional three times with deionized water to completely remove any unreacted nickel salts or reducing agent. The samples were then dried in an oven at 40° C. to yield 0.92 g of a gray powder of coated polymer particles.

Under an optical microscope a metallic, a mirror-like coating on the particles could be observed. The samples was analyzed by energy disperse x-rays using a PGT analyzer on an Electroscan environmental scanning electron microscope. Nickel was detected on the coated particles.

EXAMPLE 11

The polymers of Examples 4 and 7 were tested for physical properties. The results are listed in Table 3.

TABLE 3

| Property | Example 4 | Example 7 | Form | Remarks |
|---|---|---|---|---|
| Compressive Strength, kg/mm$^2$ | 10 | 9.5 | block | ASTM D695 |
| Compression Elastic Modulus, kg/mm$^2$ | 310 | 320 | | |
| Specific Gravity | 1.08 | 1.08 | sheet | ASTM D792 |
| Thermal Expansion Coefficient, 10$^{-5}$/° C. | 5.4 | 5.6 | sheet | ASTM D696, modified for average 20~80° C. |
| Volume Resistivity, 10$^{17}$ Ohm cm | 1.0 | 1.0 | sheet | ASTM D257 |
| Dielectric Constant, 1 kHz | 2.7 | 2.7 | sheet | ASTM D150 |
| Dielectric Dissipation | 0.0080 | 0.0073 | | |
| Transmittance | 91% | 90% | sheet | ASTM D1003 |
| Haze | 1.0% | 0.8% | | |
| Refractive Index | 1.59 | 1.59 | sheet | |

EXAMPLE 12

The polymer particles of the present invention were evaluated to determine their elastic modulus, harness, and recovery factor. The elastic modulus and hardness were calculated using the formulae disclosed in U.S. Pat. No. 5,486,941 (Saiuchi et al.) and U.S. Pat. No. 5,231,527 (Takanashi et al.). These data are reported in Table 4.

TABLE 4

| Example | Particle Size ($\mu$m) | Elastic Modulus | Hardness | Recovery Factor (%) |
|---|---|---|---|---|
| 3 | 5.0 | 529 | 619 | 44 |
| 3 | 4.5 | 574 | 671 | 41 |
| 4 | 4.1 | 588 | 687 | 40 |
| 4 | 4.5 | 600 | 701 | 37 |
| 4 | 6.0 | 521 | 609 | 52 |
| 8 | 4.5 | 640 | 748 | 44 |
| 9 | 3.4 | 732 | 856 | 39 |

What is claimed is:

1. A liquid crystal display containing a spacer particle formed from a copolymer of 1 to 30% wt of a multifunctional (meth)acrylate monomer and 70 to 99% wt of a multifunctional aromatic monomer, wherein the multifunctional (meth)acrylate monomer is a ($C_2$–$C_{18}$)alkanediol di(meth)acrylate.

* * * * *